United States Patent [19]

Nagasawa et al.

[11] Patent Number: 4,870,509

[45] Date of Patent: Sep. 26, 1989

[54] COMPACT VIDEO SIGNAL RECORDING AND/OR REPRODUCING APPARATUS ADAPTED FOR EXTERNAL INPUT VIDEO SIGNALS AND VARIABLE SPEED REPRODUCTION

[75] Inventors: Kenichi Nagasawa; Koji Takahashi; Hiroto Yasumura; Ohikara Sato; Tadayoshi Nakayama, all of Kanagawa, Japan

[73] Assignee: Canon Kabushiki Kaisha, Tokyo, Japan

[21] Appl. No.: 34,838

[22] Filed: Apr. 6, 1987

[30] Foreign Application Priority Data

Apr. 9, 1986 [JP] Japan .................................. 61-082937
May 22, 1986 [JP] Japan .................................. 61-118566

[51] Int. Cl.⁴ ............................................ H04N 5/782
[52] U.S. Cl. ..................................... 360/9.1; 360/10.1; 360/10.3; 360/36.1; 358/337
[58] Field of Search ..................... 358/906, 909, 337; 360/9.1, 10.2, 10.3, 11.1, 22, 33.1, 61, 63, 64, 18, 24, 36.1, 36.2

[56] References Cited

U.S. PATENT DOCUMENTS 4,623,940 11/1986 Matsumoto et al. ............... 360/10.3
4,630,132 12/1986 Terada et al. ..................... 360/9.1 X Primary Examiner—Robert L. Richardson
Attorney, Agent, or Firm—Robin, Blecker, Daley & Driscoll

[57] ABSTRACT

An apparatus for recording and/or reproducing video signals is disclosed. First and second video signals from an imaging unit and an external video input, respectively, are coupled to the apparatus. A converter circuit selectively acts to form a time expanded or time compressed version of the input video signal depending upon whether the input is the first or second input signal. In the former case, the first input video is recorded on a recording medium and the time expanded version coupled to a display, while in the latter case, the second input video signal is coupled to the display and the compressed version recorded. During the reproduction, the converter circuit also generates a time expanded version of the reproduced signal for coupling to the display.

25 Claims, 4 Drawing Sheets

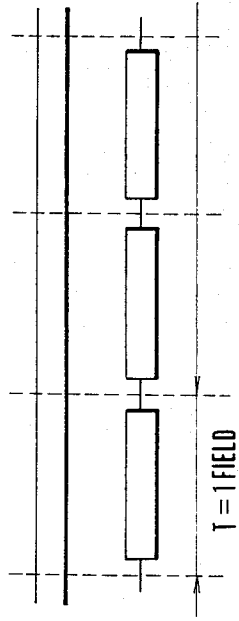
{ FIG.4(a)
  FIG.4(b) } PRIOR ART
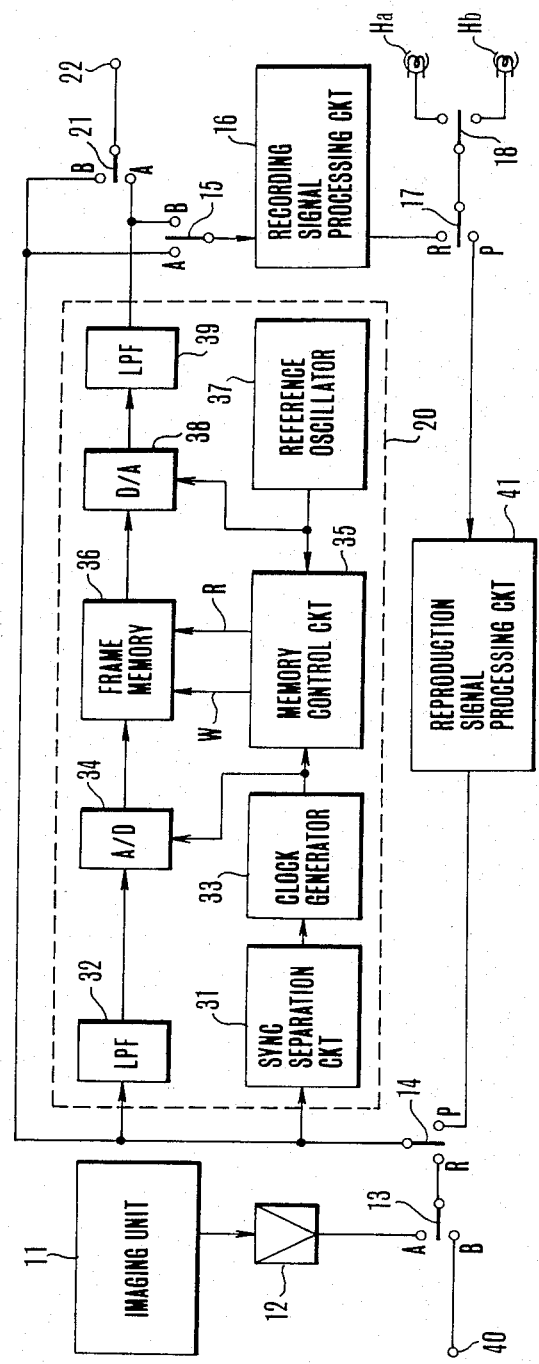
FIG.5

COMPACT VIDEO SIGNAL RECORDING AND/OR REPRODUCING APPARATUS ADAPTED FOR EXTERNAL INPUT VIDEO SIGNALS AND VARIABLE SPEED REPRODUCTION

BACKGROUND OF THE INVENTION

1. Field of the Invention

This invention relates generally to a video signal recording and/or reproducing apparatus, and more particularly to a video signal recording and/or reproducing apparatus which records and/or reproduces a video signal of one field unit in a period shorter than the original one field period.

2. Description of the Prior Art

A variety of video tape recorders (VTRs) equipped with an integral video camera have been proposed in the past. In the so-called "camera-integrated type VTRs" of the kind described above, reduction of the weight and size of the main body has been the greatest problem.

On the other hand, in VTRs for home use, a so-called "two rotary head helical scan type" has been known. FIG. 1 of the accompanying drawings shows the arrangement of the heads of VTRs of this type. In the drawing, reference numeral 1 represents a magnetic tape and reference numerals 2a and 2b represent tape guides that wind the tape 1 around the outer periphery of a rotary drum 3 in the range of angle of more than 180°.

Symbols HA and HB represent rotary heads, that are fitted to the rotary drum 3 with a phase difference of 180° between them. They have azimuth angles different from each other. These heads HA and HB record and reproduce the video signals of one field unit while rotating by 180°, as is well known in the art.

In VTRs of this type, the track length of the video signal of one field unit is determined in advance by standard and the diameter of the rotary drum 3 is inevitably determined in accordance with the track length. Therefore, the drum diameter cannot be reduced and this is the problem to be solved in order to reduce the weight and size of VTRs.

On the other hand, VTRs which can reduce the drum diameter have been proposed to this date, as will be described below. FIG. 2 shows the head arrangement of the conventional VTRs having a small diameter drum. In the drawing, symbols Ha and Hb represent rotary heads having mutually different azimuth angles and each rotating once per one-field period of the video signals. The tape 1 is wound around the drum 4 over a wide angle range of more than 300° and the rotary heads Ha and Hb record the video signals of the one-field unit while rotating 300°. In other words, during the one-field period, a video camera, not shown, scans the picture surface (represented by dotted line Y in FIG. 3) having an aspect ratio 9:10, and a picture surface having an aspect ratio 3:4 among them represented by solid line X in FIG. 3 is recorded by the heads Ha and Hb as the effective picture surface in a 5/6-field period.

The recording timing will be explained with the timing chart of FIGS. 4(a) and 4(b). In the drawings, the video camera, not shown, scans the Y picture surface having an aspect ratio 9:10 during the period represented by symbol T in the drawings to obtain a video signal consisting of 315 continuous horizontal scanning lines as shown in FIG. 4(a).

However, it is only 5/6 in each field period that the heads Ha and Hb traces actually the tape 1. Therefore, 262.5 horizontal scanning components among 315 are picked up as shown in FIG. 4(b) and are recorded on the magnetic tape as a video signal having an aspect ratio 3:4. At this time, since the heads Ha and Hb trace alternately the magnetic tape, recording can be made by VTR having the head arrangement such as shown in FIG. 2 in the same way as VTR having the head arrangement shown in FIG. 1. However, since the heads Ha and Hb must have a slight phase difference at this time, the video signal of the first or second field must be somewhat delayed.

When recording of the video signal is made by use of the head arrangement shown in FIG. 2, the drum diameter can be reduced to 3/5 of VTR shown in FIG. 1.

In VTRs having the head arrangement shown in FIG. 2, however, reproduction of the recorded video signal cannot be made. For, even when the signal is reproduced from the tape 1 by use of the heads Ha and Hb shown in FIG. 2, continuous reproduced video signals such as shown in FIG. 4(b) cannot be obtained.

To cope with such a problem, Japanese Laid-Open patent application No. Sho 60-19372 discloses a construction which can reproduce the video signals by use of a variable delay line. In VTR disclosed in this prior art reference, the reproduced video signal (having a reproduction RF waveform such as shown in FIG. 4(b) obtained in the 5/6-field period of the one-field period is extended time-axially by use of the variable delay line in order to obtain the continuous reproduced video signal.

If reproduction becomes possible in such VTRs, a desire will naturally occur to use such VTRs also as a desk-top type. In other words, if the compact VTR using the small diameter drum can make photographing by the camera, record television programs, monitor, and so forth, it is no longer necessary to prepare two VTRs, that is, the camera-integrated type VTR and the desk-top type VTR, and this will be extremely advantageous for users in general.

However, in the heretofore known VTR of the type described above, recording of external input signals such as a television signal received by a tuner, for example, cannot be made.

In ordinary desk-top type VTRs in general, on the other hand, models capable of variable speed reproduction such as so-called "still reproduction", "slow motion reproduction", "high speed search", and the like, in addition to ordinary reproduction, have become wide spread. However, such a function of variable speed reproduction cannot be added to the camera-integrated type VTRs because the weight of VTR and the number of heads increase.

SUMMARY OF THE INVENTION

It is an object of the present invention to eliminate the problems of the prior art technique described above.

It is another object of the present invention to provide a compact video signal recording and/or reproducing apparatus which can record external input video signals.

In order to accomplish the objects described above, a preferred embodiment of the present invention provides a video signal recording apparatus which comprises input means for inputting video signals of one picture surface unit in every first predetermined period; compression means for compressing time-axially the video signals of one picture surface unit inputted from the input means in a second predetermined period shorter than the first predetermined period; and recording means, including a rotary head rotating once in the first predetermined period, for recording the video signals compressed time-axially by the compression means on a recording medium.

It is another object of the present invention to provide an economical and compact video signal recording and/or reproducing system.

To accomplish the object described above, another preferred embodiment of the present invention provides a video signal recording and reproducing apparatus which comprises imaging means for outputting video signals of one picture surface unit for a period shorter than a predetermined period, in every predetermined period; recording/reproduction means including rotary heads rotating once in the first predetermined period, for recording and reproducing the video signals outputted from the imaging means to and from a recording medium; output means for selectively outputting the video signal outputted from the imaging means and the video signal reproduced from the reproduction means; and extension means for extending time-axially the video signal outputted from the output means so that one picture surface unit corresponds to the predetermined period.

It is still another object of the present invention to provide a video signal recording and reproducing apparatus which is compact in size and light in weight and can make variable speed reproduction without increasing the number of heads.

In accordance with still another preferred embodiment of the present invention, there is provided an apparatus for reproducing video signals from a recording medium having formed thereon two kinds of tracks of the video signals of one picture surface unit recorded in mutually different directions of magnetization, the apparatus comprising a pair of heads arranged in such a manner as to trace the tracks in a second predetermined period for every first predetermined period longer than the second predetermined period, and having mutually different azimuth angles; judgement means for judging which of the pair of heads provides a reproduction signal having a higher level; and output means for selectively outputting the reproduced signals of the pair of heads on the basis of the result of judgement by the judgement means.

These and other objects and novel features of the present invention will become more apparent from the following description when taken in conjunction with the accompanying drawings.

BRIEF DESCRIPTION OF THE DRAWINGS

FIGS. 4(a) and 4(b) are timing charts in the recording mode in VTR shown in FIG. 2;

FIG. 5 is a schematic view showing the construction of a camera-integrated type VTR in accordance with one embodiment of the present invention;

DESCRIPTION OF THE PREFERRED EMBODIMENTS

Hereinafter, some preferred embodiments of the present invention will be described with reference to the accompanying drawings.

FIG. 5 shows the schematic construction of a camera-integrated type VTR in accordance with a first embodiment of the present invention.

First of all, the image output recording operation of an imaging unit 11, which reads out a video signal having 262.5 horizontal scanning lines in a 5/6 period of the one-field period described already, will be described.

Figure 1:
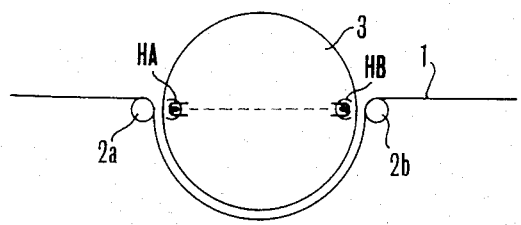
FIG. 1 shows the head arrangement of a rotary 2-head helical scan type VTR.
Figure 2:
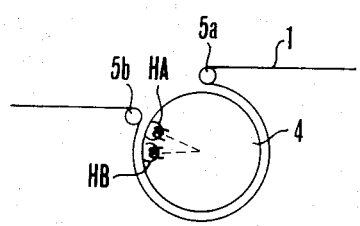
FIG. 2 shows the head arrangement in conventional VTRs having a small diameter drum.
Figure 3:
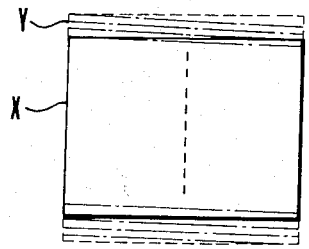
FIG. 3 is an explanatory view useful for explaining scanning of a video camera in VTR shown in FIG. 2.

When the imaging unit 11 reads out the video signal such as shown in FIG. 4(b), the signal is supplied to a signal processing circuit 16 through an amplifier 12, an A terminal of a switch 13, an R terminal of a switch 14 and further through an A terminal of a switch 15. In the recording signal processing circuit 16, the luminance signal of the video signal is subjected to frequency modulation (FM) while the chrominance signal is subjected to balanced modulation in its low band and to frequency multiplex. After passing through the recording signal processing circuit 16, the video signal is supplied to the heads Ha and Hb through an R terminal of a switch 17 and a switch 18. The heads Ha and Hb are arranged as shown in FIG. 2 and each rotates once in a one-field period and records the video signals of the one-field while rotating by 300°. The switch 18 is changed over by a known rotary phase detection circuit of the rotary drum.

Figure 6:
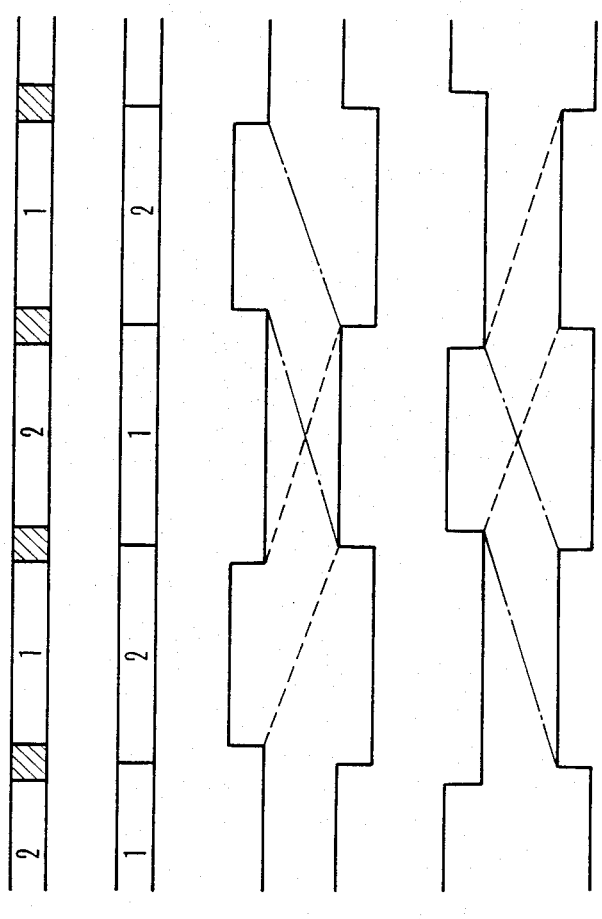
FIGS. 6(a) through 6(f) are timing charts useful for explaining the recording and reproducing operations of VTR shown in FIG. 5.

At this time, the video signal outputted from the switch 14 is supplied to a time axis conversion circuit 20 and extended time-axially by this circuit 20. At this time, a video signal having a non-signal portion between the fields, such as shown in FIG. 6(a), is outputted from the switch 14, and this video signal is extended time-axially by the time axis conversion circuit 20 to 6/5 of each field to obtain an ordinary video signal such as shown in FIG. 6(b), which is then outputted from an output terminal 22 through the A side of a switch 21. The video signal thus outputted is supplied to CRT of an electronic view finder or a television receiver, for example.

Next, the operation of the time axis conversion circuit 20 will be described in detail. The video signal outputted from the switch 14 is inputted to a sync separation circuit 31 and a low-pass filter (LPF) 32. The sync separation circuit 31 separates the sync signal in the video signal, and a clock generator 33 generates a clock which is in synchronism with this sync signal. The frequency of this clock is set to one that can sample the video signal with a sufficient level of resolution, such as 4 fsc' or 3 fsc'. Here, the term "fsc'" represents the subcarrier frequency of the chrominance signal in the video signal outputted from the switch 14 and is 6/5 times the subcarrier frequency (fsc) of the chrominance signal of the television signal.

The output clock of this clock generator 33 is used as a sampling signal of an analog-to-digital (A/D) convertor 34 and is also inputted to a memory control circuit 35 as a timing pulse. The memory control circuit 35 generates a write control pulse (W) of a memory in synchronism with the output of the frame clock generator 33 and a read control pulse (R) of the memory 36 in synchronism with the oscillation output of a reference oscillator 37. If the frequency of the write control pulse (W) is 4 fsc' at this time, the frequency of each of the read control pulse (R) and the output signal of the reference oscillator 37 is 4 fsc.

The frame memory 36 writes the video signal of the first field at the timing shown in FIG. 6(c) and reads it at the timing shown in FIG. 6(d). On the other hand, the video signal of the second field is written into another portion at the timing shown in FIG. 6(e) and read out at the timing shown in FIG. 6(f).

The output signal of the frame memory 36 is converted again to the ordinary analog signal by a digital-to-analog (D/A) convertor 38 and is outputted from the terminal 22 through LPF 39. In this manner, the video signal obtained by the imaging unit 11 is supplied in the signal form such as shown in FIG. 6(a) to the switch 18, recorded on the tape and supplied as the ordinary video signal from the terminal 22 to the electronic view finder or an external monitor.

Next, recording of an external input signal such as from a tuner will be described. Reference numeral 40 represents a terminal, to which an external video signal is inputted. At this time, the switches 13, 15 and 21 are connected to the B side, respectively. The external input video signal is outputted from the terminal 22 through the B terminal of the switch 13, the R terminal of the switch 14 and the B terminal of the switch 21. The output signal of the switch 14 is compressed time-axially by a time axis convertor 20 in a one-field unit and supplied to the recording signal processing circuit 16 through the B terminal of the switch 15. At this time, the time axis convertor 20 supplies the video signal having the signal form shown in FIG. 6(b) as the video signal having the signal form shown in FIG. 6(a) to the recording signal processing circuit 16. In other words, the video signal supplied to the recording signal processing circuit 16 is the same when the video signal read out from the imaging unit 11 and when the external input video signal is recorded. Therefore, recording of the video signal on the tape can be made in the same way in both of these cases, and the ordinary video signal is outputted from the terminal 22 to the monitor, or the like.

Here, the operation of the time axis convertor 20 when time axis compression is made to 5/6 will be explained. If the frequency of the clock outputted from the clock generator 33 is 4 fsc, the frequency of the write control pulse (W) of the frame memory is also 4 fsc. At this time, the oscillation frequency of the reference oscillator 37 and the frequency of the read control pulse of the memory frame 36 are both 4 fsc'. In this case, the write timing of the video signals of the first and second fields are such as shown in FIGS. 6(d) and 6(f), respectively, while the read frequencies of the first and second fields are such as shown in FIGS. 6(c) and 6(e), respectively.

Finally, the reproducing operation will be explained. The switches 14 and 17 are connected to the P side, respectively, in the reproducing mode. The video signal reproduced by the heads Ha and Hb is supplied to the reproducing signal processing circuit 41 through the P terminals of the switches 18 and 17, and signal processing known in the art of VTR is effected. After reproduction, the switch 21 is connected to the A side, and the video signal outputted from the reproducing signal processing circuit 41 is outputted from the terminal 22 through the time axis convertor 20. In this case, the time axis convertor 20 effects time axis extension of 6/5 described above and converts the video signal from the signal form shown in FIG. 6(a) to the signal form shown in FIG. 6(b).

In accordance with the camera-integrated VTR described above, it is possible to record and reproduce the video signal from its exclusive camera and the external input video signal by merely using one frame memory and moreover, to reduce drastically the weight and size of VTR.

If the supply of the write control pulse (W) to frame memory 36 is stopped in the reproduction mode in this case, a still picture signal is outputted from the terminal 22 and reproduction of the still picture can be made satisfactorily. Furthermore, various specific effects can be obtained by suitably controlling the write and read operations to and from the frame memory 36.

Figure 7:
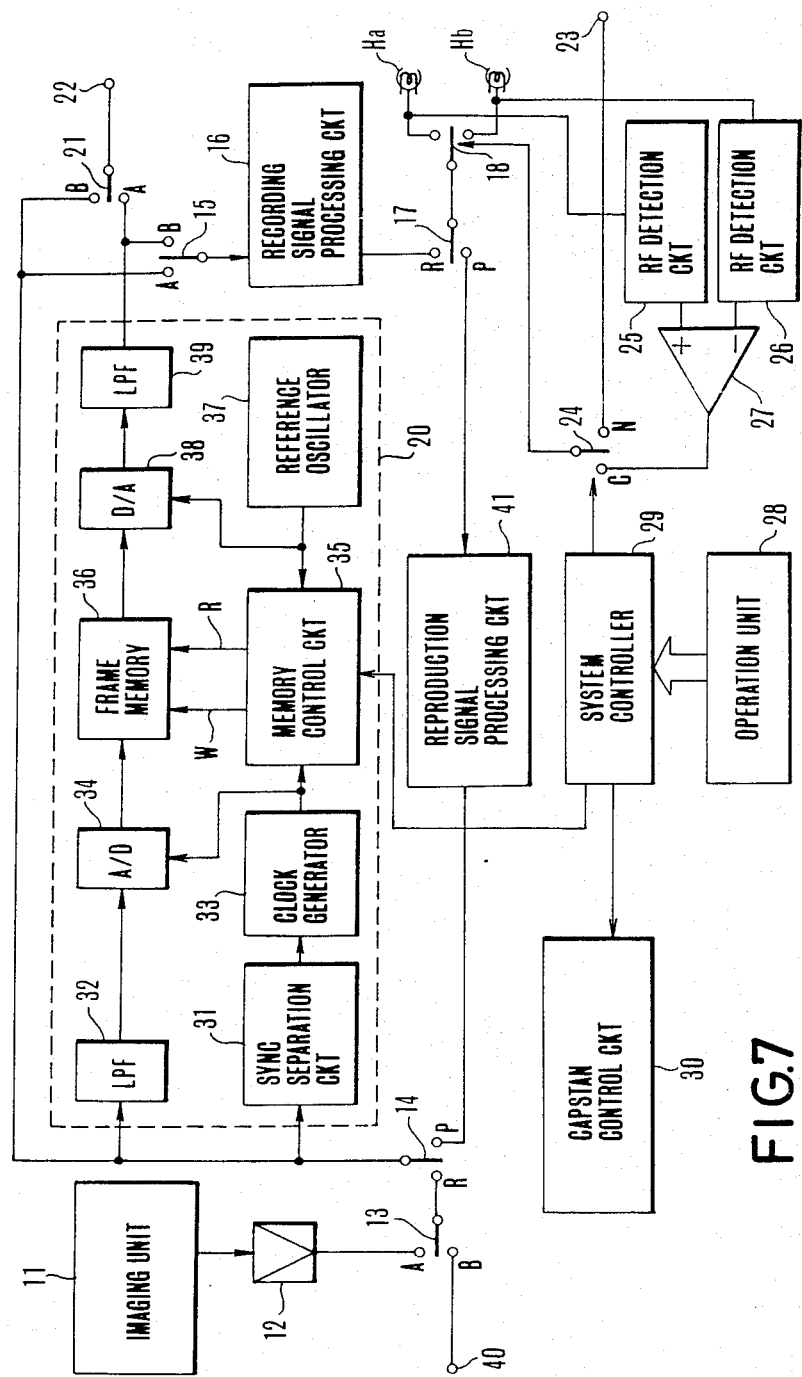
FIG. 7 is a block diagram showing the construction of a camera-integrated type VTR in accordance with another embodiment of the present invention.

FIG. 7 shows the construction of the camera-integrated type VTR in accordance with another embodiment of the present invention. In this drawing, like reference numerals are used to identify like constituents as in FIG. 5 and the description of such constituents will be omitted. The recording operation and the normal reproducing operation are exactly the same as in the foregoing embodiment shown in FIG. 5. However, in the recording mode and the normal reproduction mode, the switch 24 is connected to the N side by the control data obtained from a system controller 29 in accordance with the operation of an operation unit 28 and the switch 18 is changed over by the rotation phase detection signal (PG) of the rotary drum inputted from the terminal 23.

Next, the operation at the time of variable speed reproduction in this embodiment will be described. When the normal reproduction is effected as described above, the system controller 29 stops the supply of the write control pulse (W) to the frame memory 36 of the memory control circuit 35 upon receipt of a still picture reproduction command from the operation unit 28. Thereafter, a capstan control circuit 30 stops the travel of the magnetic tape. Therefore, the video signals having the same frame are sequentially read out from the frame memory 36 and the still picture can be reproduced extremely excellently.

On the other hand, when the operation unit 28 generates a high speed search command, the system controller 29 instructs the capstan control circuit 30 to raise the travelling speed of the tape to a level incomparably higher than the normal travelling speed. On the other hand, the switch 24 is connected to the C side. At this time, the heads Ha and Hb supply the reproduced reproduction signals to the RF detection circuits 25 and 26, respectively. The outputs of these detection circuits 25 and 26 are compared by a comparator 27 in order to judge which of the heads provides a greater reproduction output. The output of the comparator 27 controls the head selector switch 18 through the C terminal of the switch 24.

There is thus obtained always a good reproduction signal from the switch 18. The output signal from this switch 18 is applied to the reproduction signal processing circuit 41 and the time axis conversion circuit 20 and outputted as the reproduction video signal from the terminal 22 in the same way as in the normal reproduction mode.

According to the construction described above, the heads used for ordinary recording and reproduction can be used as the so-called "double azimuth heads" and extremely excellent high speed search can be made without increasing the number of heads.

In VTR of the embodiment described above, which of the heads Ha and Hb provides a greater reproduction output is judged by comparing the reproduced RF levels of both heads. However, this judgement can be made by use of a so-called "CTL signal" recorded at the end portion of the tape, for example, and from the phase relation between the reproduced CTL and PG. In VTRs of the type in which so-called "4-frequency system tracking control" is effected, on the other hand, the judgement described above can be made by use of the tracking error signal obtained by this 4-frequency system.

What is claimed is:

1. A video signal recording apparatus, comprising:
   (a) input means for inputting a first video signal which has an information of one picture in every first predetermined period;
   (b) compression means for time-base compressing every portion of the first predetermined period of the first video signal into a second predetermined period, thereby producing a compressed video signal;
   (c) image pick-up means for producing a second video signal which has an information of one picture in the second predetermined period for the every first predetermined period; and
   (d) recording means for selectively recording the compressed video signal and the second video signal on a recording medium.

2. An apparatus according to claim 1, wherein said recording means includes a cylindrical member, a rotary head which rotates around the cylindrical member in the every first predetermined period, and a guide member for guiding the recording medium around the cylindrical member by more than an angle at which the rotary head rotates while the second predetermined period.

3. An apparatus according to claim 1, further comprising extending means for time-base extending a portion of the second predetermined period of the compressed video signal to the first predetermined period for the every first predetermined period, thereby producing an extended video signal.

4. An apparatus according to claim 3, further comprising output means for selectively outputting the extended video signal and the first video signal.

5. An apparatus according to claim 1, further comprising reproducing means for reproducing the video signal recorded on the recording medium.

6. An apparatus according to claim 5, wherein said reproducing means includes a rotary head which rotates in the every first predetermined period.

7. An apparatus according to claim 6, further comprising extending means for time-base extending a portion of the second predetermined period of a video signal reproduced by said reproducing means to the first predetermined period for the every first predetermined period, thereby producing an extended video signal.

8. An apparatus according to claim 7, wherein said compression means and said extending means have a common memory for temporarily storing the video signals.

9. An apparatus according to claim 7, further comprising switching means for selectively supplying the second video signal and the video signal reproduced by said reproducing means to said extending means.

10. A video signal recording and reproducing apparatus, comprising:
    (a) image pick-up means for producing a picked-up video signal which has an information of one picture in a second predetermined period for every first predetermined period;
    (b) recording means for recording the picked-up video signal on a recording medium;
    (c) reproducing means for reproducing a video signal recorded on the recording medium, thereby producing a reproduced video signal;
    (d) switching means for selectively producing the picked-up video signal and the reproduced video signal;
    (e) extending means for time-base extending a portion of the second predetermined period of a video signal produced by said switching means to the first predetermined period for the every first predetermined period; and
    (f) output means for outputting a video signal time-base extended by said extending means.

11. An apparatus according to claim 10, wherein said recording means and said reproducing means have a common rotary head which rotates in the every first predetermined period.

12. A video signal reproducing apparatus, comprising
    (a) reproducing means for reproducing a video signal from a recording medium, the video signal having an information of one picture in a second predetermined period for every first predetermined period;
    (b) extending means for time-base extending a portion on the second predetermined period of the video signal reproduced by said reproducing means to the first predetermined period, said extending means including a memory which is able to store the information of one picture of the video signal and which is arranged to write a digital signal at a first rate and to read the digital signal at a second rate lower than the first rate;
    (c) manually operable means for instructing a reproduction of a still image, said manually operable means being arranged to produce an instruction signal;
    (d) inhibiting means for inhibiting to write the digital signal in the memory in response to the instruction signal; and
    (e) output means for outputting a video signal time-base extended by said extending means.

13. An apparatus to claim 12, further comprising image pick-up means for producing a video signal which has the information of one picture in the second predetermined period for the every first predetermined period; and recording means for recording the video signal produced by said image pick-up means on the recording medium.

14. An apparatus according to claim 13, further comprising switching means for selectively supplying the video signal reproduced by said reproducing means and the video signal produced by said image pick-up means to said extending means.

15. An apparatus according to claim 12, wherein said reproducing means includes a rotary head which rotates in the every first predetermined period.

16. A video signal recording apparatus for reproducing a video signal from a recording medium on which two kinds of tracks having different azimuth angles from each other are alternately formed, a portion of the video signal having an information of one picture recorded on each of the tracks, said apparatus comprising:
(a) a pair of reproducing heads respectively arranged to reproduce the video signal in a second predetermined period for every first predetermined period longer than the second predetermined period;
(b) discriminating means for discriminating which of the pair of the heads reproduces the video signal having a higher level, said discriminating means being arranged to produce a discriminating signal; and
(c) switching means for selectively outputting the video signal reproduced by the pair of the heads in the response to the discriminating signal.

17. An apparatus according to claim 16, further comprising extending means for time-base extending a portion of the second predetermined period of the video signal outputted by said switching means to the first predetermined period.

18. An apparatus according to claim 16, wherein said discriminating means includes a pair of detection circuits each of which detects a level of the video signal reproduced by each of the pair of the heads.

19. An apparatus according to claim 18, wherein said discriminating means further includes a comparison circuit for comparing outputs of the pair of the detection circuits to produce the discriminating signal.

20. An apparatus according to claim 16, wherein said apparatus has a first mode in which said switching means alternately outputs the video signals reproduced by the pair of the heads in the every first predetermined period, and a second mode in which said switching means selectively outputs the video signals reproduced by the pair of the heads in response to the discriminating signal.

21. An apparatus according to claim 20, further comprising moving means for moving the recording medium in a direction crossing the tracks, said moving means being arranged to move the recording medium at a first speed while the apparatus is in the first mode and to move the recording medium at a second speed different from said first speed while the apparatus is in the second mode.

22. An apparatus according to claim 16, wherein said pair of reproducing heads rotate in the every first predetermined period, and the heads are arranged closely.

23. A video signal recording apparatus for reproducing a video signal from a recording medium on which many tracks are formed in parallel, a portion of the video signal having an information of one picture recorded on each of the tracks, said apparatus comprising:
(a) a pair of reproducing rotary heads for reproducing the video signal from the recording medium, the pair of rotary heads rotating closely;
(b) discriminating means for discriminating which of the pair of the heads reproduces the video signal having a higher level, said discriminating means being arranged to produce a discriminating signal; and
(c) switching means for selectively outputting the video signal reproduced by the pair of heads in response to the discriminating signal in a first mode and for alternately outputting the video signals reproduced by the pair of the heads in every first predetermined period in a second mode.

24. An apparatus according to claim 23, wherein the pair of reproducing rotary heads respectively reproduce the video signal in a second predetermined period for the every first predetermined period.

25. An apparatus according to claim 24, wherein the pair of rotary heads have mutually different azimuth angles.

* * * * *